Aug. 3, 1943.  W. E. STEWART  2,325,637
FORMATION OF POROUS RUBBER PRODUCTS
Filed June 23, 1938
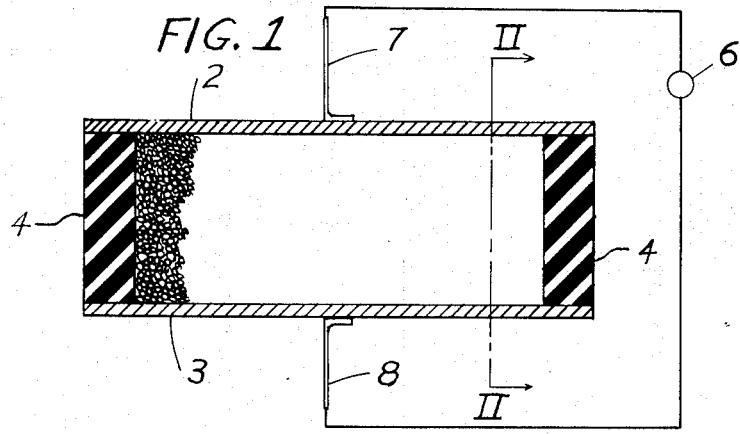
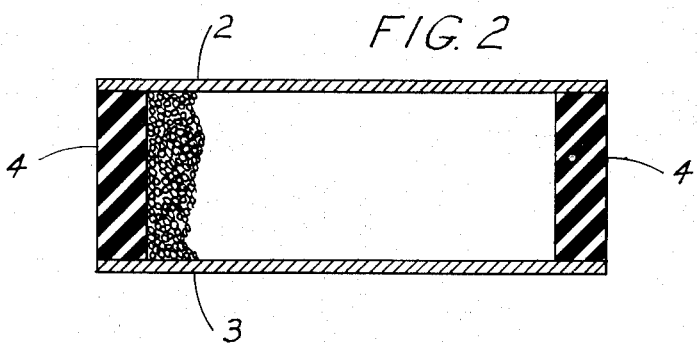
INVENTOR
William E. Stewart Patented Aug. 3, 1943

2,325,637

UNITED STATES PATENT OFFICE 2,325,637

FORMATION OF POROUS RUBBER PRODUCTS

William E. Stewart, Cuyahoga Falls, Ohio, assignor of one-half to Theodore A. Te Grotenhuis, Olmstead Falls, Ohio Application June 23, 1938, Serial No. 215,419

15 Claims. (Cl. 260—723)

This invention is a continuation in part of my prior application Serial No. 104,591, filed October 8, 1936, and relates to a process for manufacturing porous rubber products from compounded latex mixtures. It particularly relates to a process wherein electrical current is used.

Porous rubber products, such as sponge rubber cushions, etc., have heretofore been made by processes which comprise forming a froth of a compounded latex mixture, mixing a gelling agent with the froth, pouring the froth into a closed mold, allowing it to gel, and curing the product by immersing the mold in hot water or steam. These processes are not entirely satisfactory because it is difficult to cure the center of thick articles, and the curing temperature can not be raised above the boiling point of water without destroying the froth; hence, a long curing time is necessary. They possess further disadvantages because expensive non-corrosive metal molds must be used to obtain suitable heat transfer for curing purposes.

I have found that porous rubber products of any thickness can be produced in relatively inexpensive molds made almost entirely of wood, by passing an electrical current through a froth of compounded latex or artificial rubber dispersions. I have also found that, when the products are cured electrically, the curing temperature may be raised considerably without destroying the porosity of the products. I have further found that while a gelling agent may be added to the froth it is unnecessary in my process.

The mechanism of gellation without a gelling agent is not definitely known but probably is due to the vaporization of stabilizing agents from the films of the bubbles. Since the gaseous material of the froth is effectively a non-conductor, the exceedingly thin films formed from the walls of the bubbles must carry all the current. If the current is of considerable magnitude the film of latex is heated much more rapidly than the interior of the bubbles and the ammonia or other stabilizing agent is vaporized from the films and gellation takes place whether or not a gelling agent had been added to the froth. Variations in surface temperatures, which cause the collapse of ungelled bubbles when heat is applied as heat, do not occur because the electrical current is applied almost uniformly over bubble surfaces.

The accompanying drawing illustrates a mold which is suitable for forming sponge rubber products by my process.

Figure 1 is a vertical longitudinal section through a mold for containing a compounded latex mixture and showing the electrical connections for passing an electric current through the compounded latex mixture in order to gel and cure it.

Figure 2 is a vertical section through the mold on the line II—II of Figure 1.

Referring more particularly to the drawing, Figures 1 and 2 illustrate a mold for forming a block of sponge rubber from compounded latex mixtures. The mold comprises the metallic electrodes 2 and 3 separated by the side members 4 which may be constructed of wood or other insulating material suitably treated to prevent absorption of latex. The electrodes 2 and 3, which respectively form the top and bottom of the mold are removably fastened to the side pieces 4 by means of screws or by other convenient means in such a manner as to provide a leak-proof mold. An electromotive force from a suitable generator 6 is impressed between the conductors 7 and 8 which make electrical contact with the electrodes 2 and 3.

In the preparation of the porous products by my process, an emulsion or dispersion of rubber, balata, gutta percha, or a mixture of these or similar resins with suitable compounding and frothing ingredients is formed into a froth or mass of minute bubbles by any convenient means, for example, by mechanically beating or whipping air into the liquid material. The top electrode 2 is removed from the mold and the frothed latex mixture is poured into the mold in sufficient quantity to completely fill it. The top 2 is then replaced and fastened to the side pieces 4 in such a manner as to prevent the escape of appreciable vapor from the mold. An alternating electromotive force impressed between the electrodes 2 and 3, causes a current to flow through the froth 5 which is first gelled or coagulated and by further passage of current it may be completely cured.

The voltage applied between the electrodes 2 and 3 may be varied widely without producing unsatisfactory coagulation or curing. It is preferable to apply a sufficient voltage to raise the temperature of the froth rapidly to the curing temperature desired and to then cut the voltage just sufficiently to maintain that temperature. Thus, with a mold containing electrodes spaced 4 inches apart, a voltage of 110 volts may be applied. The initial current varies according to the density of the froth and may be in excess of 30 amperes per square foot of electrode area, but this is reduced considerably by increased resistance due to a slight polarization of the electrodes. When the desired temperature is reached, the voltage is adjusted to a value sufficient to maintain this temperature. The material is held at the vulcanization temperature for a sufficient time to wholly cure the product or to cure it to a degree such that it can be removed from the mold without permanently deforming it.

The following examples illustrate the preparation of the porous rubber articles. Parts are by weight.

*Example 1*

Accelerator: Parts

| | |
|---|---:|
| Piperidine pentamethylene dithiocarbamate | 75 |
| Mercaptobenzothiazole | 75 |
| Antioxidant (Age Rite powder) | 87 |
| Preservative (phenol) | 75 |
| Sulfur | 300 |
| Water | 1,450 |
| Glue | 400 |
| Ammonium hydroxide (concentrated) | 25 |

These ingredients are mixed together and the mixture milled for 48 hours in a ball mill. The resulting dispersion is used as a compounding reagent for latex batches, and it is henceforth, designated as solution A.

*Example 2*

| | Cubic centimeters |
|---|---:|
| Latex (60% solution) | 1,200 |
| Solution A | 120 |
| Zinc oxide (20% dispersion) | 6 |
| Potassium sulfide (10% solution) | 6 |
| Gelling agent (10% ammonium sulfate solution) | 3 |

The latex and solution A, prepared in Example 1, are whipped or beaten into a froth which occupies several times the volume of the original liquid. The aqueous dispersion of zinc oxide and potassium sulfide, which contains the gelling agent, is then thoroughly mixed into the froth; whereupon, the mixture is poured into a mold 1 inch thick with electrodes spaced 1 inch apart. A 50 volt, 60 cycle, alternating E. M. F. is impressed between the electrodes, which are constructed of tin and have an area of 325 square inches. The initial current is 45 amperes. After 10 minutes, the current has decreased to 23 amperes and after 20 minutes the current is but 11 amperes and the material is well cured.

Although the preferred process is to wholly cure the porous rubber products in the mold by means of the electrical current, they may be partially cured in the mold and finish-cured by floating them in hot water. The latter method removes the soluble rancid-smelling material while the article is being finish-cured and the molds are not utilized for as long a period of time.

The gelling agent in the above examples is desirable but may be omitted; the latex mixture in the above examples may be replaced by any latex mixture which is suitable for making sponge rubber articles by other processes. If desired, the frothed material containing sufficient gelling agent may be allowed to gel in the mold before the electrical current is passed through the mixture. The current is then used solely to cure the products.

In my process the rubber is gelled in position; it is not plated out of the liquid on the electrodes as is the case with the so-called electro-deposition processes. Direct current can be used in my process with a degree of success, but alternating current is much more satisfactory. When direct current is used a greater amount of polarization takes place and a very thin film of rubber is plated on the electrodes when the initial voltage is applied and before gellation takes place.

Aqueous dispersions of coagulated rubber, reclaim rubber, or vulcanized rubber may be employed as alternatives or as admixtures to the natural rubber, balata, or gutta percha dispersions. Accordingly, the term, rubber-like material, as used in the appended claims includes these materials. Curing temperatures well above the boiling point of water may be used in my process without adversely affecting the porosity of the finished product.

In the appended claims, the term "commercially transformable alternating current" is intended to include only alternating currents which may be passed through iron core transformers, and modified in value, without having high loss. Radio frequency currents, which cannot be transformed in iron core transformers and which are accordingly very inefficient for commercial processes, are not, therefore, included within the term.

I claim:

1. In a process for producing porous rubber articles wherein a liquid containing a rubber latex and suitable compounding ingredients is formed into a froth and the froth gelled and vulcanized in a mold, the step which comprises passing an electric current through the froth in sufficient quantity to gel and cure it in cellular form having the shape of the mold.

2. In a process for producing porous rubber articles wherein a liquid containing a rubber latex is formed into a froth and the froth gelled and cured, the step which comprises passing an electric current through the froth in sufficient quantity and for a sufficient time to vulcanize the froth in cellular form.

3. In a process for producing porous rubber articles wherein a liquid containing rubber latex and suitable compounding ingredients is formed into a froth and the froth gelled and cured, the step which comprises passing an electrical current through the froth in sufficient quantity to raise the temperature of the froth to a curing temperature and for a sufficient time to cure the froth to such an extent that it can be removed from a mold wihout permanently destroying the cellular structure.

4. A process for producing sponge rubber products from rubber-like material which contains suitable compounding ingredients, which comprises forming an aqueous dispersion of a rubber into a froth, and passing an electric current through the froth in sufficient quantity to gel and cure it.

5. A process for producing sponge rubber products which comprises forming a froth of an aqueous dispersion of a rubber which contains suitable compounding ingredients and a gelling agent, adding the froth to a mold, allowing it to gel, and passing an alternating electric current through the froth in sufficient quantity and for sufficient time to vulcanize the froth permanently in the shape and contour of the mold.

6. A process for producing sponge rubber products which comprises forming a froth of a liquid containing rubber latex and suitable compounding ingredients, adding the froth to a mold and passing an alternating current through the froth in sufficient quantity to gel and cure it.

7. A process for producing sponge rubber products which comprises forming a liquid containing rubber latex and suitable compounding ingredients into a froth, adding the froth to a mold, and gelling the froth in the absence of a gelling agent by passing an alternating electric current thru the froth.

8. A process for producing sponge rubber products from rubberlike material which contains suitable compounding ingredients, which comprises forming an aqueous dispersion of a rubber into a froth, and passing a commercially transformable alternating current through the froth in sufficient quantity to gel and cure it in cellular form.

9. A process for producing sponge rubber products which comprises forming a froth of an aqueous dispersion of a rubber which contains suitable compounding ingredients and a gelling agent, adding the froth to a mold, allowing it to gel, and passing a commercially transformable alternating electric current through the froth in sufficient quantity and for sufficient time to vulcanize the froth permanently in the shape and contour of the mold.

10. A process for producing sponge rubber products which comprises forming a froth of a liquid containing rubber latex and suitable compounding ingredients, adding the froth to a mold, and passing a commercially transformable alternating current through the froth in sufficient quantity to gel and cure it in cellular form.

11. A process for producing sponge rubber articles which comprises forming a suitably compounded latex mixture into a froth, pouring the froth into a mold and into contact with conducting electrodes, and then passing an alternating electric current between the conducting electrodes and through the froth in a sufficient quantity to vulcanize it in cellular form.

12. A process for producing sponge rubber products which comprises forming an aqueous dispersion of a rubber into a foam, disposing the foam between and in contact with suitable electrodes, and passing an alternating electric current through the foam between the electrodes in sufficient quantity and at sufficient rate to prevent the form from reverting to the liquid state and causing it to permanently retain the shape it occupied between the electrodes.

13. A process for producing sponge rubber products which comprises forming an aqueous dispersion of rubber into a foam, disposing the foam between and in contact with suitable electrodes, and passing an electric current through the foam between the electrodes at a sufficiently high rate to cause curing of the foam in cellular form in situ, the degree of said curing being such that the material may be removed from between the electrodes without destroying its cellular structure.

14. The method of claim 13 wherein the gellation is accomplished in the absence of effective amounts of gelling agent.

15. A process for producing sponge rubber products which comprises forming an aqueous dispersion of a rubber into a foam, disposing the foam between suitable electrodes and passing electric current between the said electrodes and through the foam to form sufficient heat in the walls of the bubbles to cause at least partial curing of the rubber in situ.

WILLIAM E. STEWART.